United States Patent Office.

HUGH McDONALD, OF PITTSBURG, PENNSYLVANIA.

Letters Patent No. 89,876, dated May 11, 1869.

IMPROVEMENT IN THE MANUFACTURE OF STEEL-FACED IRON PLATES.

The Schedule referred to in these Letters Patent and making part of the same.

*To all whom it may concern:*

Be it known that I, HUGH McDONALD, of the city of Pittsburg, in the county of Allegheny, and State of Pennsylvania, have invented a new and useful Improvement in Manufacture of Steel-Faced Iron Plates; and I do hereby declare the following to be a full, clear, and exact description thereof.

For many purposes, in the arts, metallic plates are required, which shall possess great strength, toughness, and tenacity of fibre, and, at the same time, have a hard, smooth face, and capable of receiving a high finish.

Such a combination of qualities is especially desirable in plow-plates.

To secure such a combination, plates have been made with an iron centre and steel face on one or both sides, by welding iron and steel plates together, also, by casting a steel face on to a previously-heated iron slab, in a suitably-constructed mould, and, also, by subjecting one or both faces of a homogeneous iron slab, or ingot to the process of cementation, thereby converting such face or faces into steel.

My invention relates to the production of such plates, but of a greatly improved quality, and differs, in the mode of accomplishing the object, from all those above referred to; and The nature of it consists in the manufacture of such plates by combining the processes of welding and cementation, so as to secure a centre or back, as the case may be, of tough fibrous iron, and a face or faces of a high quality of steel, each layer of iron or steel being almost entirely homogeneous in its character, but all securely united together into a single plate.

My invention is applicable to the production of plates of any required number of layers of iron or steel, but I propose to apply it chiefly in making plates of two or three layers, one or both faces being of steel, and the back or centre being of iron; and to enable others skilled in the art to make and use my invention, I will proceed to describe the same, first, as applied in making plates with steel faces and iron centre.

For the iron centre, I take a plate, bar, slab, or ingot of wrought-iron, which has but little affinity for carbon, or which possesses but a small amount of carbon, since I find that the less carbon a wrought-iron plate contains, the more slowly will it be converted into steel by cementation.

For the outside surfaces, I take plates, bars, slabs, or ingots of wrought-iron, or a low quality of steel, such as possess a larger proportion of carbon, or have a greater affinity therefor, so that when subjected to the process of cementation, they will be readily and rapidly converted into steel of a high quality.

These plates, of any desirable size or thickness, I bring to a welding-heat, and weld together, either under the hammer or by passing them through between rolls, using, if necessary, any of the ordinary fluxes, to facilitate the welding. After they are thus welded, they may be drawn out between rolls in the usual way, either before or after cementation, or partly before and partly after.

In order to secure a steel surface of a high quality in such compound plates, I subject them to the process of cementation in any suitably-constructed furnace, covering with clay or otherwise protecting, if necessary, the parts of the plate not to be converted.

The iron or low quality of steel, which forms the outer layers as described, is of such quality as is readily and rapidly converted into steel, while the centre, being of a quality of iron that has but little affinity for carbon, will be affected but little, or not at all, by the converting of the outer layers. Hence, the surfaces of the compound plate may be converted as perfectly as may be desired into steel of the hardest quality, and capable of receiving a high polish, while the centre is almost wholly, if not not entirely unaffected by the cementing-process, and retains all its qualities of toughness, strength, and flexibility.

The same process may be applied to making plates having a steel face and iron back, the steel face only being converted.

Two or more layers of iron, or of iron and steel, may be used for the centre or back, provided the layer or ayers of iron, next the face-plate or plates, be of a quality not so readily converted into steel as the face-plates themselves are.

When the plates are finished by cementation and rolling, they are ready for market, or to be cut up into plow-plates or other useful articles.

What I claim as my invention, and desire to secure by Letters Patent, is—

The hereinbefore-described mode of making compound metallic plates, by welding together two or more plates, slabs, bars, or ingots of iron of different relative capacities for taking carbon, or of iron and a low quality of steel, and then subjecting the face or faces of such compound plates to the process of cementation, substantially as described.

In testimony whereof, I, the said HUGH McDONALD, have hereunto set my hand.

HUGH McDONALD.

Witnesses:
G. H. CHRISTY,
JOHN GLENN.